(12) United States Patent
Patterson

(10) Patent No.: US 9,288,965 B2
(45) Date of Patent: Mar. 22, 2016

(54) REINFORCED FEEDER FOR LIVESTOCK

(71) Applicant: Rick Patterson, Kalamazoo, MI (US)

(72) Inventor: Rick Patterson, Kalamazoo, MI (US)

( * ) Notice: Subject to any disclaimer, the term of this patent is extended or adjusted under 35 U.S.C. 154(b) by 313 days.

(21) Appl. No.: 14/064,957

(22) Filed: Oct. 28, 2013

(65) Prior Publication Data

US 2015/0114300 A1    Apr. 30, 2015

(51) Int. Cl.
*A01K 1/10* (2006.01)
*A01K 5/01* (2006.01)

(52) U.S. Cl.
CPC .... *A01K 1/10* (2013.01); *A01K 5/01* (2013.01)

(58) Field of Classification Search
CPC ........... A01K 1/10; A01K 5/01; A01K 5/107; A01K 7/005; A01K 5/0107
See application file for complete search history.

(56) References Cited

U.S. PATENT DOCUMENTS

| | | | | |
|---|---|---|---|---|
| 3,400,688 A * | 9/1968 | Koinzan | ................. | A01K 5/015 119/51.01 |
| 4,706,609 A * | 11/1987 | Delichte | ............. | A01K 5/0107 119/58 |
| 5,337,699 A * | 8/1994 | Dyson | ..................... | A01K 5/01 119/60 |
| 5,699,753 A * | 12/1997 | Aldridge, III | ........ | A01K 5/0225 119/52.1 |
| 5,868,098 A * | 2/1999 | Adams | .................... | A01K 1/10 119/60 |
| 5,921,202 A * | 7/1999 | Schulz | ..................... | A01K 5/01 119/58 |
| 6,550,421 B1 * | 4/2003 | Sturgis | .................... | A01K 5/01 119/51.11 |
| 7,717,064 B1 * | 5/2010 | O'Neill | .................... | A01K 5/01 119/58 |
| 8,910,592 B1 * | 12/2014 | Kurtz | ....................... | A01K 5/01 119/52.1 |
| 2002/0179016 A1 * | 12/2002 | Plymell | ................... | A01K 5/01 119/61.3 |
| 2006/0182523 A1 * | 8/2006 | Burkhardt | ............... | A01K 5/01 414/24.5 |
| 2006/0231037 A1 * | 10/2006 | Gross | ................... | A01K 5/0241 119/52.1 |
| 2008/0190370 A1 * | 8/2008 | Coady | .................. | A01K 5/0225 119/52.1 |
| 2010/0050948 A1 * | 3/2010 | Lienemann | .............. | A01K 5/01 119/60 |
| 2010/0083905 A1 * | 4/2010 | Robbins, III | ......... | A01K 5/0107 119/52.1 |
| 2011/0192350 A1 * | 8/2011 | Lush | ..................... | A01K 39/012 119/52.1 |
| 2015/0020740 A1 * | 1/2015 | Lacey | ...................... | A01K 5/01 119/60 |

* cited by examiner

*Primary Examiner* — Monica Williams
*Assistant Examiner* — Magdalena Topolski
(74) *Attorney, Agent, or Firm* — Hansen IP Law PLLC

(57) ABSTRACT

A livestock feeder with improved corrosion resistance and collapse resistance is described. The feeder comprises a polymeric cylinder with an open top and an interior surface. The interior surface defines a hollow interior where feedstuffs can be placed. One or more feeding portals extend through the cylinder to provide livestock access to feedstuffs. The feeding portals include a lower ledge against which livestock exerts a force while accessing feedstuffs in the feeder interior. A reinforcing annulus extends around the interior surface of the feeder proximate to and below the lower feeding portal ledge. The reinforcing annulus may be integrally formed with the polymeric cylinder or separately formed and attached to the polymeric cylinder. The feeder can withstand repeated feedings without collapse.

12 Claims, 1 Drawing Sheet

Page 1

REINFORCED FEEDER FOR LIVESTOCK

FIELD

This disclosure relates to an extended use feeder for livestock, such as cattle, and more specifically to an extended use feeder that with reduced susceptibility or no susceptibility to corrosion or collapse under normal use.

BACKGROUND

Hay and other feedstuffs are often accumulated in large (500-1500 lb) round rolls (bales) and/or square bales and stored for feeding cattle or other livestock when natural forage is unavailable. Feeders are used to allow the livestock to retrieve feedstuff while preventing them from full access which could cause unnecessary waste of feedstuff via trampling. Livestock, particularly cattle, stick their heads through a portal in the device to retrieve the feedstuff and a "skirt" is placed around the outside of the feeder which keeps hay from falling outside the feeder and being trampled.

In the recent past, feeders have been produced entirely out of metal which have excellent mechanical integrity, but will eventually corrode in the wet, manure rich environment they find themselves. Due to this corrosion, the life span of a typical hay feeder is likely less than 10 years.

Recently, attempts have been made to manufacture cattle feeders entirely out of plastic relying on the resiliency of the plastic to bounce back as the cattle push in toward the feedstuff. These feeders have been marketed as having a lifetime warranty.

However, unfortunately, it has been found that the commercial plastic feeders mentioned above would eventually collapse at the lower ledge of the portal under the pressure of the cattle at the point where the breastbone of the bovine pressed in past the lower ledge of the portal toward the feedstuff. The resiliency of the plastic, promoted as a feature of the product, has not been sufficient to sustain the structural integrity of the feeder.

Thus, a need has arisen for a feeder that is rust resistant and sufficiently rigid to sustain compression at the point of pressure as the livestock reach in through a portal toward the feedstuff.

SUMMARY

In a first aspect, a livestock feeder is provided which comprises a polymeric cylinder with an open top, an exterior surface, an interior surface, and at least one feeding portal extending through the polymeric cylinder from the exterior surface to the interior surface. The at least one feeding portal includes a lower ledge spaced apart from the open top. During feeding, livestock exert a force against the lower ledge while standing outside of the feeder and accessing feed inside the feeder. A reinforcing annulus is provided along the interior surface proximate the lower ledge. In one example, the polymeric cylinder is formed from a high density polyethylene. In another example, the high density polyethylene is a high molecular weight polyethylene. In a further example, the high density polyethylene is a high molecular weight copolymer of ethylene and an alpha-olefin, preferably, 1-hexene. In certain examples, the live stock feeder is capable of withstanding repeated hoop stresses at the lower ledge of the at least one feeding portal which are exerted by the breastbone of cattle weighing 800 pounds or more.

In certain implementations, the reinforcing annulus is formed from polymeric, synthetic, composite, or metallic materials. In other implementations, the reinforcing annulus is integrally formed with the polymeric cylinder. In additional implementations, the reinforcing annulus is a unitary structure that is formed separately from and subsequently attached to the polymeric cylinder. In yet other implementations, the reinforcing annulus comprises multiple arcuate segments.

The present disclosure describes the use of an annulus at one or more circumferential locations about the circumference of the non-corroding polymer feeder. The annulus can be a single piece of material to reinforce the interior curved surface of the feeder or can be constructed from more than one arcuate segments to be fastened together. Either way, the completed annulus is secured to the interior curved surfaces, particularly just beneath the feeding portals, by any conventional type of fastener which secures into polymeric material. The manner of annular reinforcement of the feeders just below the feeding portals assures that the feedstuff can be loaded into the feeder from its open top without disruption or interference from the annular reinforcement and also without disruption or interference for the livestock feeding through the feeding portals.

The number of locations of annular reinforcement of the polymeric feeder is at least one, beneath the feeding portals, but can be at least two or three depending on the annular reinforcement needed to the polymeric structure of the feeder, based on the design, configuration, and material of construction of the feeder itself.

In another aspect, a livestock feeder is provided which comprises (a) a polymeric cylinder with an open top, an interior surface, and at least one feeding portal with a lower ledge in a vertical arcuate sidewall section; and (b) a reinforcing annulus attached to the interior surface at the lower ledge and having a radius of curvature substantially the same as a radius of curvature of the polymer cylinder at the interior surface.

In a further aspect, a method of using a reinforcing annulus is provided which comprises the steps of: (a) placing the reinforcing annulus proximate a lower ledge of at least one feeding portal on an interior surface of a polymeric cylinder with an open top configured as a livestock feeder; and (b) attaching the reinforcing annulus to the lower ledge to withstand force of livestock seeking food through the feeding portal.

DETAILED DESCRIPTION

Livestock Feeder

Figure 1:
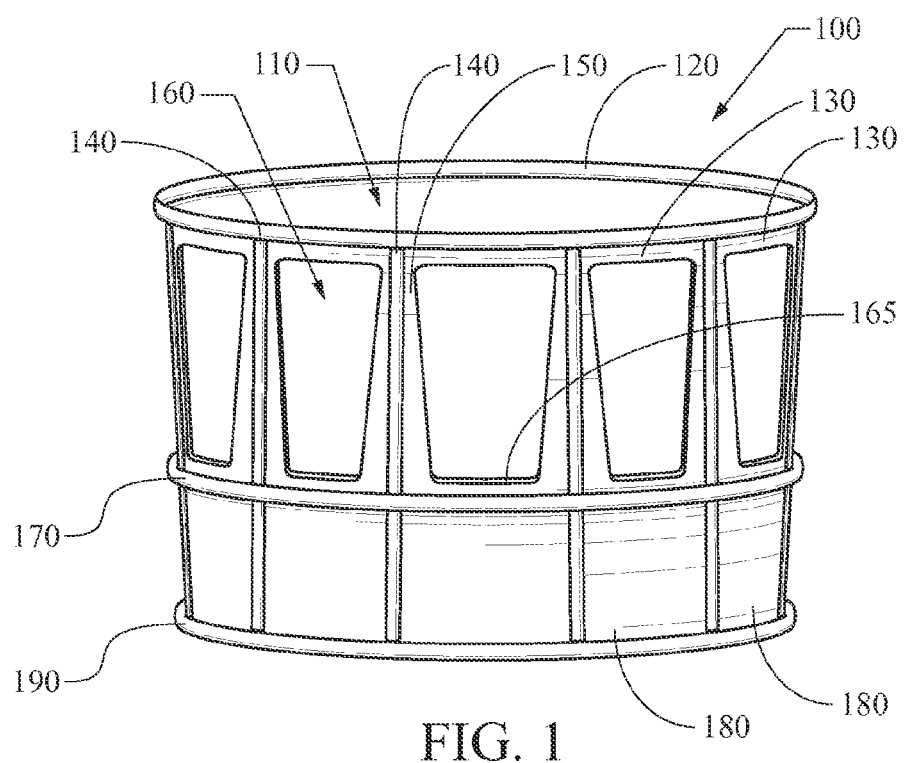
FIG. 1 shows a conventional non-corroding, polymeric livestock feeder of the prior art, having exterior curving surfaces in which a number of feeding portals reside.

FIG. 1 shows a conventional cylindrical polymeric livestock feeder 100 with an open top 110 into which feedstuff, such as hay bales, can be placed. The open top 110 is defined by a circular upper polymeric rim 120 at the top of a series of vertical arcuate sidewall sections 130 separated from one another by vertical polymer reinforcing posts 140. These posts 140 are formed as part of the molded polymeric structure of the feeder 100 and designed to provide vertical strength to the feeder 100 when placed in the fields or pens where livestock are located. The feeder 100 includes a hollow interior for holding feedstuff.

Each vertical sidewall section 130 has an upper segment 150 in which a feeding portal 160 is located. The portals 160 extend from an outer surface of the feeder to the interior surface so that the interior of the feeder (in which foodstuff is stored) is accessible from the exterior of the feeder through the portals 160. The lower edge of each portal 160 has a ledge 165 against which livestock press or lean when attempting to reach hay or other feedstuffs within the feeder 100. In certain applications involving cattle feeding, the cattle will typically exert a force at a downward angle against the lower ledge 165. The force will include a radially inward component that creates a hoop stress at the lower ledge 165. Preferred examples of the feeders described herein can withstand repeated hoop stresses caused by feeding livestock, including cattle weighing 800 pounds or more.

The upper segment 150 ends at a horizontal polymeric reinforcing rim 170 also formed as part of the molded polymeric structure of the feeder 100, at which circumference, each vertical sidewall section 130 has a closed polymeric skirt segment 180 which blocks feeding by the livestock of feedstuff within the feeder 100, except as through feeding portals 160.

As with the rim 120, the feeder 100 has a circular bottom polymeric rim 190 which contacts the ground. Thus, in typical applications, the polymeric rim 190 contacts the ground, and the skirt segment 180 is located between the polymeric rim 190 and the portals 160 in a vertically upward direction that is perpendicular to a radial direction of the feeder.

It should be noted that designers of the all-polymeric feeder 100 have attempted to provide adequate reinforcement structures at rims 120 and 190 and at posts 140 and reinforcing rim 170. Unfortunately, use of known polymeric feeders in the fields and pens where livestock are fed has revealed that known polymer molded-in structures are not adequate to withstand the pressure of hungry livestock seeking food within the feeder 100.

Figure 2:
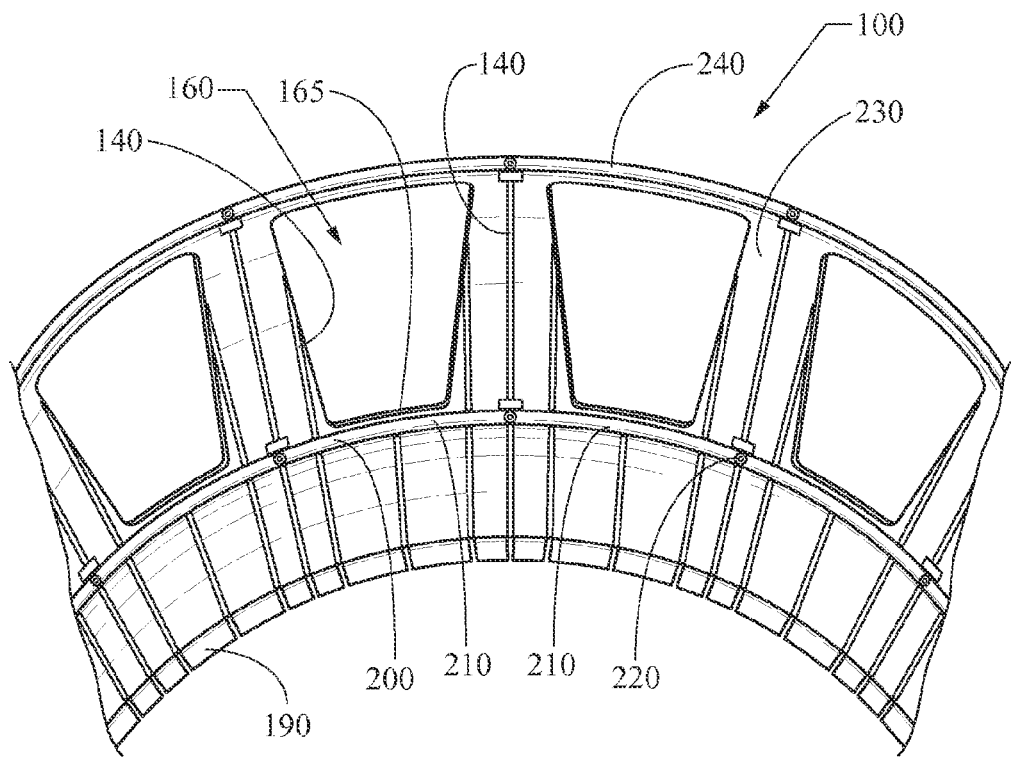
FIG. 2 shows a plan view of an arcuate portion of the interior surfaces of the livestock feeder with at least two reinforcing annuli secured above and below the feeding portals.

As seen in FIG. 2, the present disclosure modifies the known all-polymeric feeder 100 by providing at least one reinforcing annulus 200 at a horizontal location beneath ledge 165 of feeding portals 160, the location where livestock place the greatest stress upon the feeder 100 when reaching for hay or other feedstuff within the feeder 100. The reinforcing annulus 200 extends around the circumference of the interior wall surface 230 of the feeder and projects radially inward from the interior wall surface 230.

The reinforcing annulus 200 can be a single polymeric, synthetic, composite, or metallic construction of arcuate segments, wherein each segment would be rigid enough to reduce or even minimize collapse of a polymeric livestock feeder 100 at the feeding portals 160. In this embodiment, multiple arcuate segments 210 are designed to fit together and secured by fasteners 220 to form a single annulus about the lower ledge 165 of each feeding portal 160 on the interior wall surface 230 of the feeder 100. The radius of curvature of the assembled annulus 200 would be substantially the same as the radius of curvature of the livestock feeder 100 at the elevation of the lower ledge 165 of the feeding portal 160. Each segment 210 itself could be produced in one piece or multiple pieces to be later connected at the point of application by fasteners 220.

It is also possible that a single annulus 200 could be formed for unitary assembly into the livestock feeder 100. In the specific example of FIG. 2, the annulus 200 (integral or segmented) is secured to the inside lower ledge 165 of each feeding portal 160 by fasteners 220 selected from the group consisting of nuts and bolts, screws, straps, and otherwise attached or embedded into the feeder itself. However, it is further possible that a reinforcing annulus 200 can be formed from the same polymeric material as the remainder of the livestock feeder 100 and integrally formed (e.g., integrally molded) with the vertical arcuate sidewall sections 130 and the closed skirt segment 180. In preferred examples, at least one reinforcing annulus 200 is provided around the circumference of the interior wall surface 230 and positioned between the ground-contacting polymeric rim 190 and the lower ledge 165 along the height direction of the feeder (i.e., the direction perpendicular to the radial direction). In certain preferred examples, the at least one reinforcing annulus is no more than 10 inches, more preferably nor more than 5 inches, and still preferably no more than 2 inches away from the lower ledge 165 along the feeder's height direction (i.e., the direction along which the upper polymeric rim 120 and the bottom polymeric rim 190 are spaced apart).

In another embodiment, multiple annuli 200 can be used at various elevations within the livestock feeder, to provide more resistance to the force of hungry livestock seeking food. For example, a second reinforcing annulus 240 of the same or similar construction could be secured near the upper edge of the feeding portals 160 on the interior surface 230 at rim 120. As above, the radius of curvature of the annulus 240 would be substantially the same as the radius of curvature of the livestock feeder 100 at the elevation of the upper rim 120 near the upper edge of the feeding portal 160.

Another location for a second or third annulus 200 (not shown) can be at the base rim 190 of the feeder 100 on the interior surface 230 just above where the feeder 100 contacts the earth.

The result of at least the lower ledge annulus 200 and optionally the other annulus 240 or annuli is to establish a hoop strength at the inside surface 230 of the livestock feeder 100 to withstand the force of livestock seeking food, particularly at the elevation of the lower ledge 165 of each feeding portal 160. This hoop strength provides a horizontal reinforcement, preferably in complement to the vertical reinforcement of posts 140. The use of the reinforcing annulus 240 provides localized reinforcement at the feeder location that is most susceptible to collapse during feedings (or due to repeated feedings).

Feeders of the type described herein produce the unexpected benefit of reducing the feeder's susceptibility to collapse while avoiding increases in feeder weight that would accompany other reinforcement techniques. The feeders described herein reflect the discovery that feeder collapse is often caused by hoop stresses generated proximate the lower ledge 165 of the feeding portals 160. By localizing the reinforcement to the specific location of increased collapse vulnerability, the feeder can withstand repeated feedings (which may involve several animals simultaneously feeding at several portals 160 around the feeder circumference) without increasing the overall thickness of the arcuate wall sections 130 or other portions of the feeder in a manner that would undesirably increase the feeder weight without providing significant additional reinforcement.

The cylindrical structure defined by the vertical arcuate segments 130 and closed skirt segment 180 is preferably formed from a high density polyethylene (HDPE). As used herein, the term "high density polyethylene" includes polyethylenes or copolymers of ethylene and other monomers with a density of at least 0.941 g/cm$^3$ based on ASTM D1505. In certain examples, preferred HDPE materials have a density that is no greater than about 0.965 g/cm3, more preferably no greater than about 0.955 g/cm³, and still more preferably no greater than about 0.950 g/cm³.

In one example, the high density polyethylene is a high molecular weight, high density polyethylene. As used herein, the term "high molecular weight" refers to a molecular weight of from about 200,000 g/mol to about 500,000 g/mol. In the same or other examples, the high density polyethylene is a high molecular weight, high density copolymer of ethylene and an alpha-olefin. A preferred alpha-olefin is 1-hexene.

In certain examples, the high density polyethylene has a tensile strength based on ASTM D638 (Type IV, 51 mm/min) which ranges from about 20 MPa to about 38 MPa, preferably from about 22 MPa to about 30 MPa, and more preferably from about 22 MPa to about 28 MPa. In the same or other examples, the high density polyethylene has a flexural modulus-tangent (ASTM D790 at 13 mm/min) that ranges from about 1100 MPa to about 1300 MPa, preferably from about 1150 MPa to about 1250 MPA, and more preferably from about 1175 MPa to about 1225 MPa.

One suitable example of a high molecular weight, high density polyethylene that can be used to form the cylindrical structure defined by the vertical arcuate segments 130 and closed skirt segment 180 is Marlex® HXM 50100, which is supplied by Chevron Phillips Chemical Company LLC. Marlex® HXM 50100 has typical density values (ASTM D1505) of about 0.948 g/cm³, a typical tensile strength (ASTM D638, Type IV at 51 mm/min) of 25.0 MPa, and a typical flexural modulus-tangent (ASTM D790 at 13 mm/min) of 1200 MPa.

Any material formable into arcuate segments or annuli is a candidate for use for annulus 200 or annulus 240. The material for annulus 200 may be the same or different from the material for annulus 240. The material for annulus 200 may also be the same or different as the material for the polymeric cylindrical section defined by the vertical arcuate segments 130 and closed skirt segment 180. Non-limiting examples include thermoplastic polymers, metals, and composites of multiple materials, such as a thermoset fiberglass composite. A person having ordinary skill in the art of agriculture equipment could select from the conventional apparatus building materials to choose a material of sufficient arcuate strength, such that when the arcuate segments 210 are installed or the single annulus 200 is installed, that the hoop strength is sufficient to withstand the force of hungry livestock pushing on the lower ledge 165 of a feeding portal 160.

Of the various materials possible, use of polymers is preferred because, like the feeders themselves, polymeric annuli 200 and 240 would not corrode. Of polymers, polyolefins, rigid polyvinyl chloride, polyamides and other commonly used polymers in exterior or exposed environments can be used.

The dimensions of each annulus 200 or 240 at each location within the feeder 100 can vary to accommodate a balance between hoop strength and weight. For example, diameters or thicknesses of the arcuate segments 210 or an integral annulus 200 can range from about 2.54 cm to about 7.62 cm and preferably about 3.81 cm to about 6.35 cm.

Another embodiment of the livestock feeder reinforcement could optionally include vertical ribs interconnecting between annuli 200 and 240 or between the annulus 200 at the lower ledge of the portal and the earth at the rim 190 between the interior surface 230 of the livestock feeder and the earth. Any vertical rib employed would add a vertical interconnecting strength to the hoop strength brought to the sole annulus 200 at the lower ledge 165 of the feeding portal 160 or brought to the multiple annuli 200 and 240 at key locations within the feeder. The vertical rib reinforcement can be located at or adjoining vertical polymer reinforcing posts 140 or away from such pre-existing molded-in polymeric reinforcement.

All of the examples described herein are preferably configured to avoid any reinforcement piece extending radially across the interior of livestock feeder 100, so that the volume of the hollow interior for holding foodstuff or forage into the feeder 100 is maximized. In preferred embodiments, every annulus 200 and 240 and every optional rib is configured to project in an inward radial direction from interior surface 230 by an amount that is less than twenty percent, more preferably less than ten percent, and still more preferably less than five percent of the inner diameter defined by interior surface 230. In accordance with such preferred embodiments, a minimal amount of foodstuff storage capacity is lost, and there is minimal disruption to the intended uses of the feeder for deposit of hay bales or other forage.

Newly constructed feeders 100 can benefit from the annuli 200 and optionally 240 described herein. Also, existing feeders 100, even partially damaged feeders, can be retrofitted with the reinforcement annuli 200 and optionally 240.

Assembly of Reinforcement

Livestock feeder reinforcement construction could be done as one complete annulus 200 or come in ready to assemble arcuate segment pieces 210. Preferably, two arcuate segments 210 minimize the number of connections to create the annulus 200 but also provide for ease of transport to consumer. Additional reinforcement 240 and appropriate connecting hardware 220 are optional parts of the kit as sold.

Usefulness of the Reinforced Feeders

One reason for use of polymeric feeders 100 instead of metallic feeders is the polymeric feeders avoid corrosion and, if made from appropriate polymers metals, or composite, can endure both cold and heat without significant loss of structural integrity. Polymeric feeders 100 that do not need to be replaced every 10 years have significant economic and environmental value to livestock producers. It could also potentially expand the market for feeders 100 to people who do not presently use those polymeric feeders 100 as a result of their limited life expectancy because of breakage of portals 160 by livestock seeking food. Finally, it will reduce the strain on recycling and disposal facilities attempting to handle products that have failed in the field.

The annulus 200 or annuli 200 and 240 installed on the interior surface 230 of the livestock feeder 100 at key location(s) of stress allow for the use of polymeric livestock feeder despite the stress of livestock seeking food. Thus, the polymeric livestock feeder 100 can have all of the advantages which brought such products success in the market but also continued durability in spite of hungry livestock seeking food.

With certain embodiments of the livestock feeders described herein, particular components may also be available for sale—such as reinforcement rods, skirt panels, etc., so that if one part does get damaged for some reason, the entire feeder does not need to be disposed.

The invention is not limited to the above embodiments. The claims follow.

What is claimed is:

1. A livestock feeder, comprising: (a) a polymeric cylinder with an open top, an interior surface, and at least one feeding portal with a lower ledge in a vertical arcuate sidewall section, wherein the polymeric cylinder has a molded polymeric structure of vertical polymer reinforcing posts on the interior surface; and (b) a reinforcing annulus located along the interior surface beneath the lower ledge of the at least one feeding portal, the reinforcing annulus comprising multiple arcuate segments and having a radius of curvature substantially the same as a radius of curvature of the polymer cylinder at the interior surface, wherein the reinforcing annulus is secured by fasteners to the interior surface of the polymeric cylinder and provides horizontal hoop strength at the elevation of the lower ledge on the interior surface.

2. The feeder of claim 1, wherein the feeder is capable of withstanding a force exerted on the lower ledge of the at least one feeding portal by livestock feeding through the feeding portal.

3. The feeder of claim 1, wherein the polymeric cylinder has an upper rim defining the open top, and wherein feedstuff can be placed within the interior surface without disruption by the presence of the reinforcing annulus attached to the interior surface at the lower ledge of the feeding portal.

4. The feeder of claim 3, further comprising a second reinforcing annulus attached on the interior surface of the upper rim.

5. The feeder of claim 4, further comprising at least one vertical rib interconnecting the reinforcing annulus at the lower ledge of the at least one feeding portal and the second reinforcing annulus at the upper rim.

6. The feeder of claim 1, wherein polymeric cylinder is formed from high density polyethylene.

7. A method of using a reinforcing annulus comprising multiple arcuate segments, the method comprising the steps of: (a) placing the reinforcing annulus at a lower ledge of at least one feeding portal on an interior surface of a polymeric cylinder with an open top configured as a livestock feeder, wherein the polymeric cylinder has a molded polymeric structure of vertical polymer reinforcing posts on the interior surface; and (b) attaching the reinforcing annulus to the interior surface of the polymeric surface with fasteners proximate the lower ledge to withstand force of livestock seeking food through the feeding portal.

8. The method of claim 7, further comprising the steps of:
(c) placing a second reinforcing annulus at a rim adjacent the open top; and
(d) attaching the reinforcing annulus to the upper rim.

9. The method of claim 8, further comprising the steps of:
(e) attaching at least one vertical rib between the two reinforcing annuli.

10. The method of claim 7, wherein the reinforcing annulus has a diameter of from about 2.54 cm to about 7.62 cm.

11. The method of claim 7, wherein the reinforcing annulus has a radius of curvature substantially the same as a radius of curvature of the polymer cylinder at the interior surface.

12. The method of claim 7, wherein the polymeric cylinder is formed from high density polyethylene.

* * * * *